(12) United States Patent
Jou et al.

(10) Patent No.: US 7,729,022 B2
(45) Date of Patent: Jun. 1, 2010

(54) METHOD FOR PROCESSING IMAGE

(75) Inventors: Ming-Jong Jou, Tainan (TW); Yao-Jen Hsieh, Taichung (TW); Huan-Hsin Li, Miaoli County (TW)

(73) Assignee: Au Optronics Corp., Hsin-Chu (TW)

( * ) Notice: Subject to any disclaimer, the term of this patent is extended or adjusted under 35 U.S.C. 154(b) by 1051 days.

(21) Appl. No.: 11/434,161

(22) Filed: May 16, 2006

(65) Prior Publication Data
US 2007/0171474 A1 Jul. 26, 2007

(30) Foreign Application Priority Data
Jan. 20, 2006 (TW) ............... 95102288 A (51) Int. Cl.
*G03F 3/08* (2006.01)
(52) U.S. Cl. .............. 358/519; 358/1.9; 358/3.21; 358/3.23; 358/3.24; 358/3.26; 358/518; 358/520; 382/162; 382/167
(58) Field of Classification Search ......... 348/254, 348/671–677; 358/1.9, 515–522; 382/167, 382/168, 254–274; 345/88
See application file for complete search history.

(56) References Cited

U.S. PATENT DOCUMENTS

| | | | | |
|---|---|---|---|---|
| 4,984,072 A | * | 1/1991 | Sandrew | 348/34 |
| 5,177,602 A | * | 1/1993 | Fujimori | 358/522 |
| 5,268,759 A | * | 12/1993 | Kishimoto et al. | 348/606 |
| 5,381,349 A | * | 1/1995 | Winter et al. | 382/167 |
| 5,414,538 A | * | 5/1995 | Eschbach | 358/522 |
| 5,687,306 A | * | 11/1997 | Blank | 345/634 |
| 5,689,590 A | * | 11/1997 | Shirasawa et al. | 382/254 |
| 5,737,032 A | * | 4/1998 | Stenzel et al. | 348/649 |
| 5,798,790 A | * | 8/1998 | Knox et al. | 348/191 |
| 5,812,286 A | * | 9/1998 | Lin | 358/519 |
| 6,020,921 A | * | 2/2000 | Aleksic et al. | 348/254 |
| 6,167,154 A | * | 12/2000 | Renaud et al. | 382/174 |
| 6,671,000 B1 | * | 12/2003 | Cloutier | 348/675 |
| 7,256,831 B2 | * | 8/2007 | Iizuka | 348/315 |
| 7,312,776 B2 | * | 12/2007 | Bu | 345/88 |
| 7,372,507 B2 | * | 5/2008 | Ikeda et al. | 348/674 |
| 2004/0036703 A1 | | 2/2004 | Aoki et al. | |
| 2004/0066388 A1 | | 4/2004 | Leather et al. | |
| 2005/0213843 A1 | * | 9/2005 | Nojima et al. | 382/274 |

FOREIGN PATENT DOCUMENTS

| | | |
|---|---|---|
| CN | 1658680 | 8/2005 |
| CN | 1664858 | 9/2005 |

OTHER PUBLICATIONS

Translation of Chinese Application CN20051065929 Apr. 15, 2005 "Image Contrast Intensifying Method".*

* cited by examiner

*Primary Examiner*—King Y Poon
*Assistant Examiner*—Richard Z Zhu
(74) *Attorney, Agent, or Firm*—Bacon & Thomas, PLLC (57) ABSTRACT

A method for processing an image is provided. The method is to calculate the amount of original gray levels in a frame according to the original gray level difference between each pixel and an adjacent pixel thereof and adjusts the contrast of the frame according to the calculated amount of gray levels and the contrast difference between the current frame and the previous frame.

8 Claims, 6 Drawing Sheets

METHOD FOR PROCESSING IMAGE

This application claims the benefit of Taiwan application Serial No. 95102288, filed Jan. 20, 2006, the subject matter of which is incorporated herein by reference.

BACKGROUND OF THE INVENTION

1. Field of the Invention

The invention relates in general to a method for processing an image, and more particularly to a method for processing an image in order to enhance the contrast of an image in a frame.

2. Description of the Related Art

Figure 1:
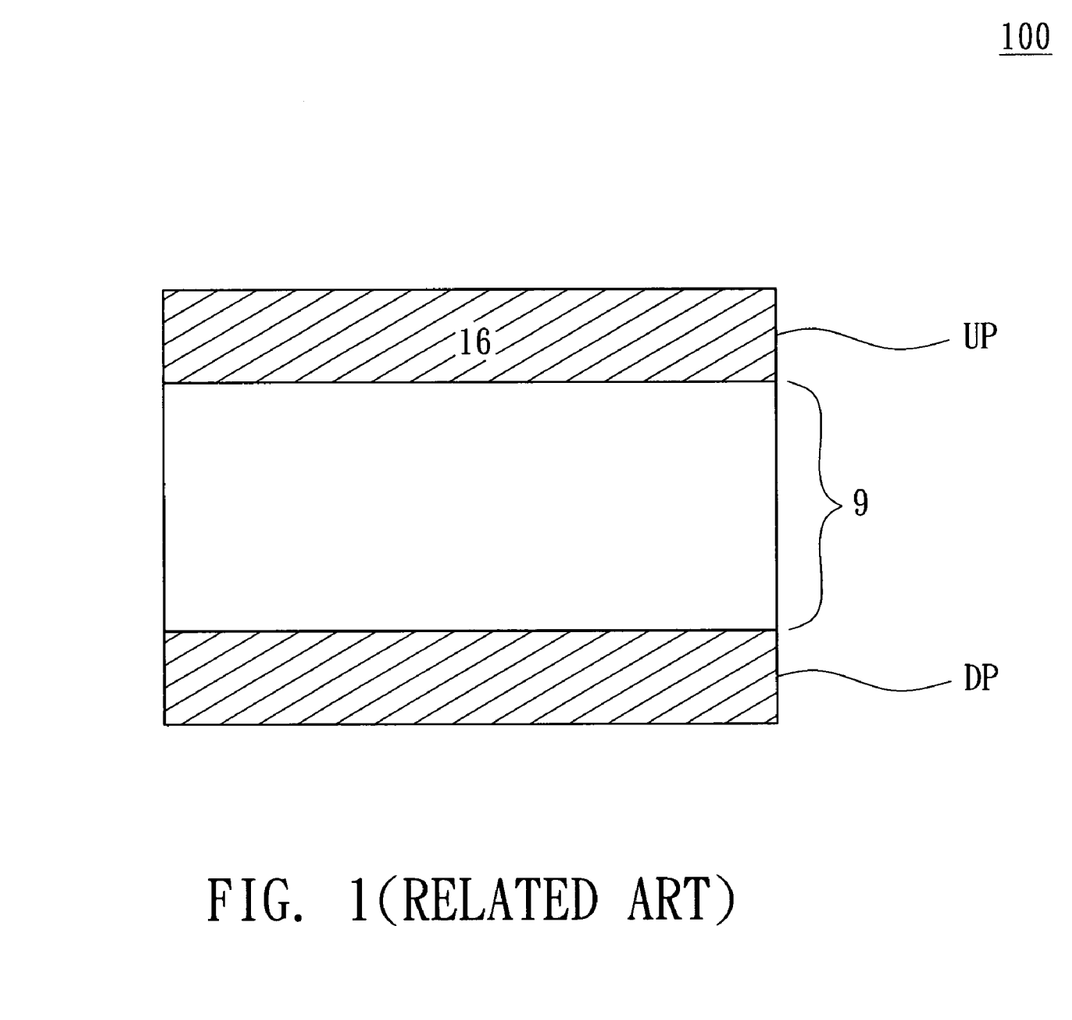
FIG. 1 (Related Art) illustrates a frame when a DVD film is played.

In a conventional method for processing an image in order to enhance the contrast of an image, the contrast of the frame image is adjusted according to the calculated amount of gray levels of each pixel in a frame. However, the above method can only enhance the contrast of the frame image under certain circumstances. Under the circumstances when the contrast of the frame image needs to be enhanced most, for example, when watching a DVD film, the conventional image processing method for enhancing the contrast may display image with very poor quality. Referring to FIG. 1, a frame of a DVD film is shown. When a DVD film is played, the frame 100 is normally displayed in a ratio of 16:9, hence resulting in a black band in both the upper part UP and the lower part DP of the frame 100 (for example, an LCD screen). Thus, when the conventional image processing method for enhancing the contrast enhances the contrast of the frame 100, the gray levels in the black frame of both the upper part UP and the lower part DP are included, causing the contrast-enhanced frame 100 to be unnatural. Besides, when the gray level curve of the current frame widely differs with the gray level curve of the previous frame, the conventional image processing method for enhancing the contrast would result in image glittering.

Therefore, how to enhance the contrast of the image and at the same time maintain the natural characteristics of the image and avoid image glittering has become an imminent challenge to be solved.

SUMMARY OF THE INVENTION

It is therefore an object of the invention to provide a method for processing an image in order to enhance the contrast of an image and maintain the stability of an image frame while the characteristics of the image are maintained natural.

The invention achieves the above-identified object by providing a method for processing an image. The image is displayed by at least one first frame f(N), which is composed of a number of pixels. Each pixel corresponds to an original gray level respectively. The method for processing an image of the invention is disclosed below. The amount of the original gray levels is calculated according to the original gray level difference between every adjacent two of the pixels. A first transfer function F(X) relative to the amount of the original gray levels is generated. A Gamma curve is calculated according to the first transfer function F(X), and the original gray levels are selectively adjusted to a number of adjusted gray levels according to the Gamma curve. The above step of calculating the amount of original gray levels further includes adding the calculated amount of at least one of the original gray levels between a first original gray level of a first pixel of the pixels and a second original gray level of a second pixel adjacent to the first pixel-accordingly when the difference between the first original gray level of the first pixel and the second original gray level of the second pixel is larger than n, where n 0 or a positive integer.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a method for processing an image in order to enhance the contrast of an image and maintain the stability of the image frame while the characteristics of the image are maintained natural. In the method for processing an image of the invention, the amount of original gray levels is calculated according to the original gray level difference between every adjacent two of the pixels. Then, the contrast of the frame is adjusted according to the calculated amount of the gray levels and the contrast difference between the current frame and the previous frame.

Figure 2:
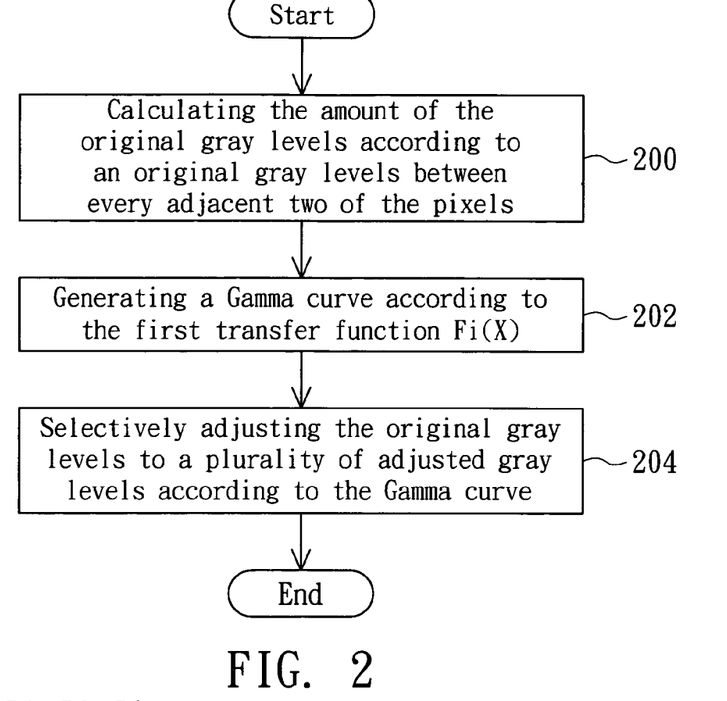
FIG. 2 illustrates a flowchart of a method for processing an image according to a preferred embodiment of the invention.

Referring to FIG. 2, a flowchart of a method for processing an image according to a preferred embodiment of the invention is shown. An image includes several frames f(N), where N is a positive integer. Each frame f(N) includes a number of pixels, for example, 1028×768 pixels. Each pixel respectively corresponds to an original gray level GL. The image processing method of the invention includes the following steps. In step 200, the amount of the original gray levels is calculated according to the original gray level difference between every adjacent two of the pixels, and a first transfer function $F_i(X)$ relative to the amount of the original gray levels is generated, where i is a positive integer ranging from 1 to N. In step 202, a Gamma curve is generated according to the first transfer function $F_i(X)$. In step 204, the original gray levels are selectively adjusted to a number of adjusted gray levels according to the Gamma curve.

Figure 3A:
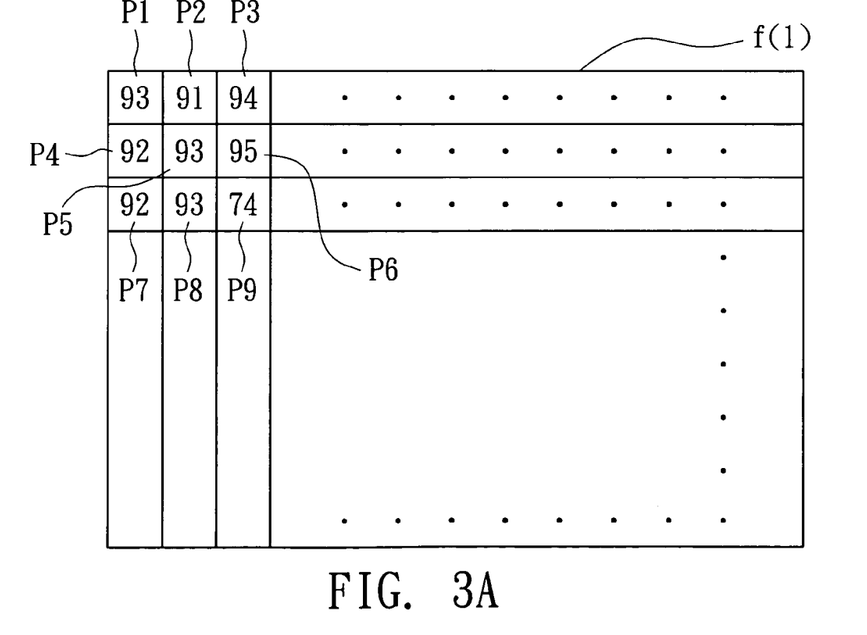
FIG. 3A illustrates an unspecified current frame.
Figure 3B:
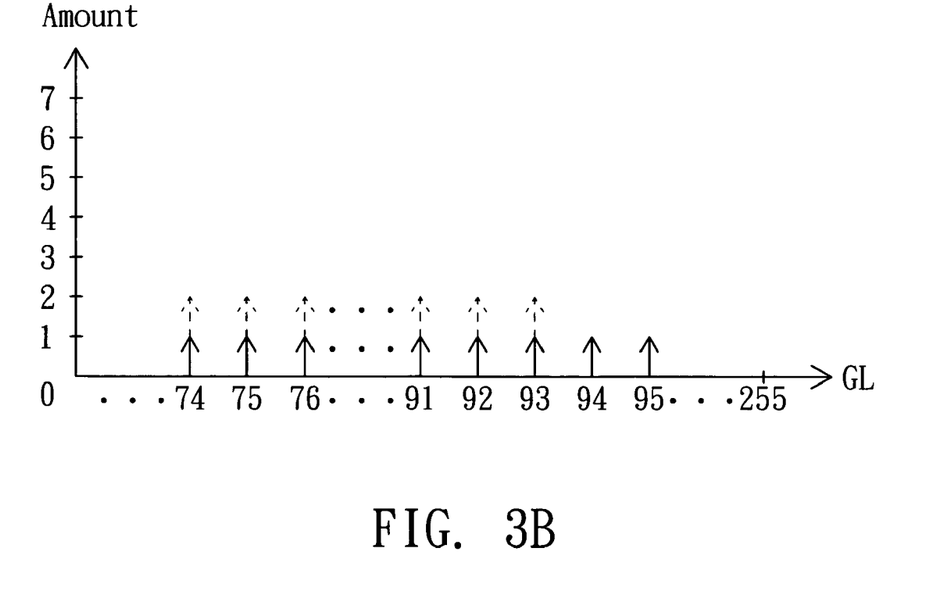
FIG. 3B is a statistical diagram illustrating the amount of original gray levels.
Figure 3C:
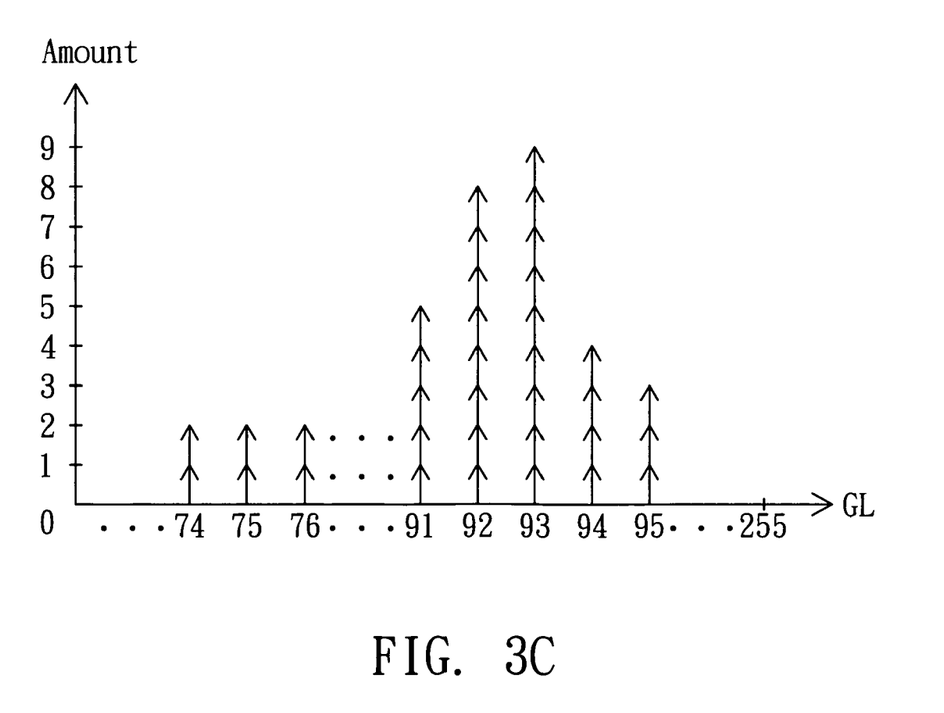
FIG. 3C is a statistical diagram illustrating the amount of original gray levels.

The statistical method of step 200 is further elaborated below. Referring to FIG. 3A, an unspecified current frame is shown. The first frame f(1) is an unspecified frame of an image. Each space of the first frame f(1) represents a pixel P, and the number labeled in the space represents the original gray level GL corresponding to the pixel P. The principle for calculating the amount of original gray levels of the first frame f(1) is exemplified by 3×3 pixels P(1)~P(9) positioned at the left top of the first frame f(1). The principle is: "adding one (1) to the calculated amount of at least one of the original gray levels between the original gray level corresponding to a first pixel of the pixels and the original gray level corresponding to a second pixel adjacent to the first pixel accordingly when the original gray level difference between the first pixel and the second pixel thereof is larger than n, where n is a predetermined value equal to 0 or a positive integer". The principle is exemplified by the ninth pixel P9 and the case when n is equal to 0. The ninth pixel P9 is adjacent to the sixth pixel P6 and the eighth pixel P8. The original gray level difference between the ninth pixel P9 and the sixth pixel P6 is 21 gray levels (95−74=>0), so each of the calculated amount from the original gray level 74 to the original gray level 95, that is, the gray levels 74, 75, 76, . . . 94, 95, is added by one as shown by the solid arrows in FIG. 3B. FIG. 3B is a diagram illustrating the amount of original gray levels. The original gray level difference between the ninth pixel P9 and the eighth pixel P8 is 19 gray levels (93−74=19>0), so each of the calculated amount from the original gray level 74 to the original gray level 93, that is, the gray levels 74, 75, . . . 92, 93, is added by one as shown by the dotted arrows in FIG. 3B. By applying the above principle to each of the pixels P1~P9 for calculating the amount of the original gray level GL, the calculated amount of some of the gray levels of the first frame f(1) are shown in FIG. 3C, a statistical diagram illustrating the amount of original gray levels.

Compared with the conventional method which merely calculates the amount of original gray levels of each pixel in a frame, the statistical method of the invention takes the original gray level difference between adjacent pixels into consideration. The generated first transfer function $F_i(X)$ considers the gray level difference in the image edge of a frame, so that the Gamma curve generated according to the first transfer function $F_i(X)$ has better performance with regards to the contrast of image. Besides, the number "n" can be equal to 1 or a positive integer, and the statistical method can add one to the calculated amount of some of the original gray levels between the original gray level corresponding to the first pixel and the original gray level corresponding to the second pixel adjacent to the first pixel. Taking the ninth pixel P9 and the eighth pixel P8 for example, the part of the calculated amount of the original gray levels from 74 to 95 by a difference of 2, namely, 74, 76, 78 . . . 92, 94, and 95 are added by 1. In the invention, the value of the difference is not limited to any particular number. For example, the amount of the original gray levels with a difference of 3, 4 or other positive integers can be calculated.

Figure 4A:
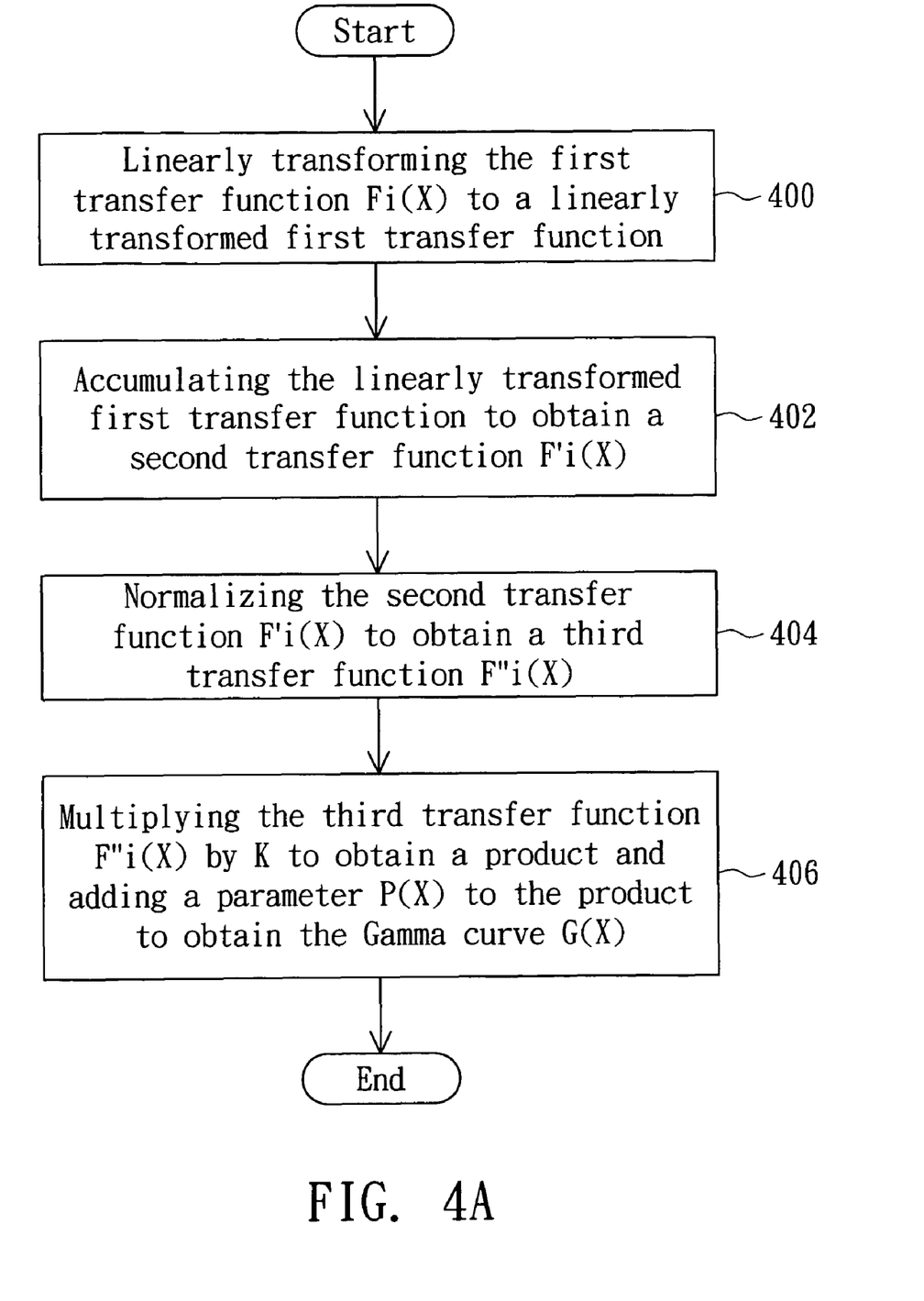
FIG. 4A illustrates a flowchart for generating the Gamma curve.
Figure 4B:
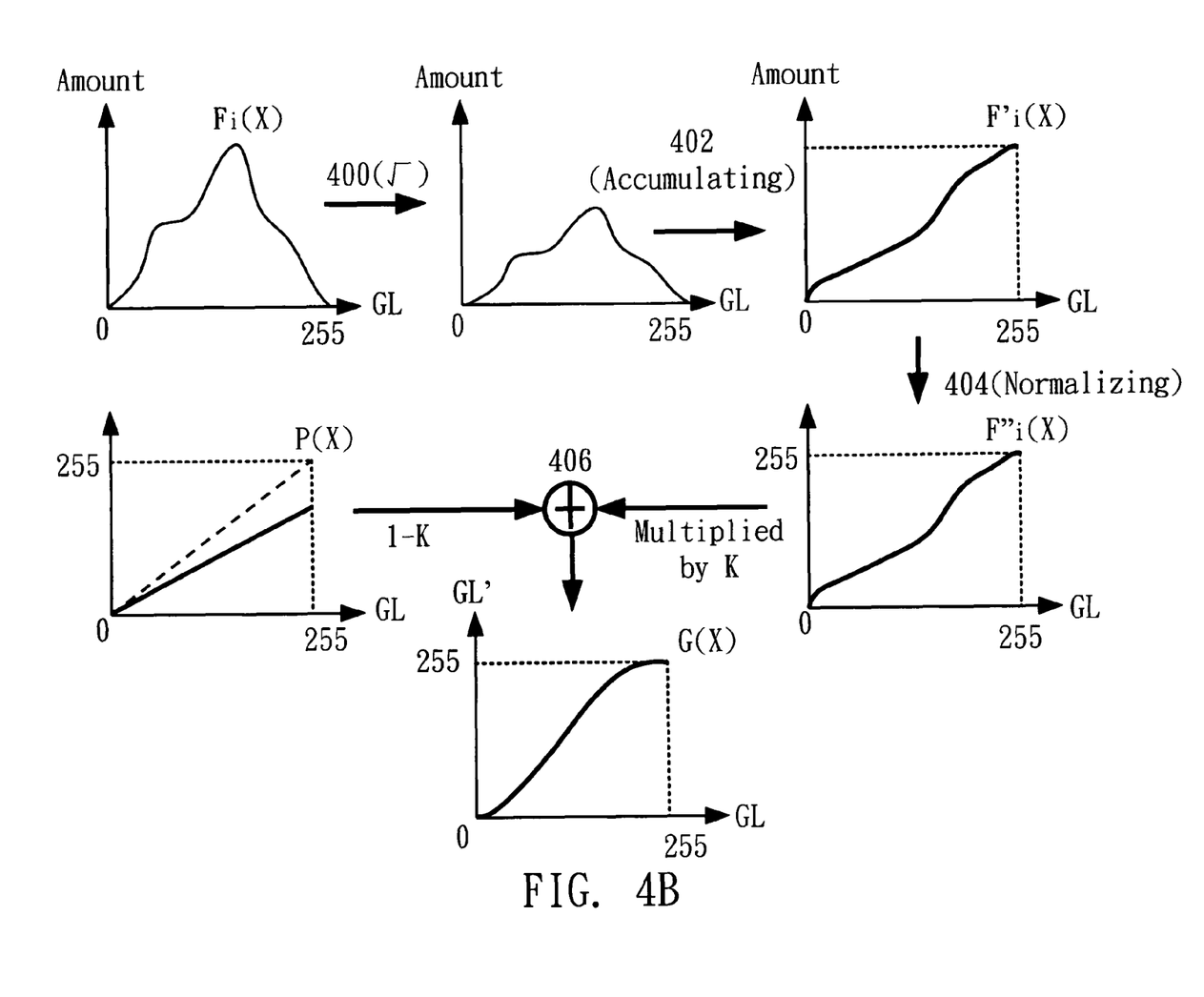
FIG. 4B illustrates the diagrams for generating the Gamma curve.

Next, the method for generating the Gamma curve is elaborated. After generating a first transfer function $F_1(X)$ by calculating the original gray level of each pixel of the first frame f(1) according to the above statistical method, a Gamma curve G(X) is generated through appropriate calculation in step 202. Please refer to both FIG. 4A and FIG. 4B at the same time. FIG. 4A illustrates a flowchart for generating the Gamma curve. FIG. 4B illustrates the diagrams for generating the Gamma curve. In step 400, the first transfer function $F_i(X)$ is linearly transformed to a linearly transformed first transfer function. The first transfer function $F_i(X)$ is linearly transformed in order to restrict the range of the outputted values of the first transfer function $F_i(X)$. For example, a squared root operation is applied to the first transfer function $F_1(X)$. Next, the method proceeds to step 402, the linearly transformed first transfer function is accumulated to obtain a second transfer function $F'_i(X)$. In step 404, the second transfer function $F'_i(X)$ is normalized to obtain a third transfer function $F''_i(X)$. For example, the calculated amount of the second transfer function $F'_1(X)$ of the first frame f(1) is normalized to the maximum gray level (for example, 255 gray levels) to obtain a third transfer function $F''_1(X)$. Next, in step 406, the third transfer function $F'''_i(X)$ is multiplied by K to obtain a product and a parameter P(X) is added to the product to obtain a Gamma curve G(X). As shown in FIG. 4B, the parameter P(X) is a curve whose slope is equal to 1−K, where K is any value ranging from about 0 to about 1 and can be predetermined. Thus, the Gamma curve $G_1(X)$ of the first frame f(1) is generated. After generating the Gamma curve $G_1(X)$, the original gray level GL of the first frame f(1) is adjusted according to the Gamma curve $G_1(X)$.

Since the first transfer function $F_1(X)$ takes the gray level difference in the edge of the image of the frame into consideration, when the first frame f(1) is a DVD film whose ratio is 16:9, the first frame f(1) adjusted according to the Gamma curve $G_1(X)$ would produce better contrast.

Figure 5:
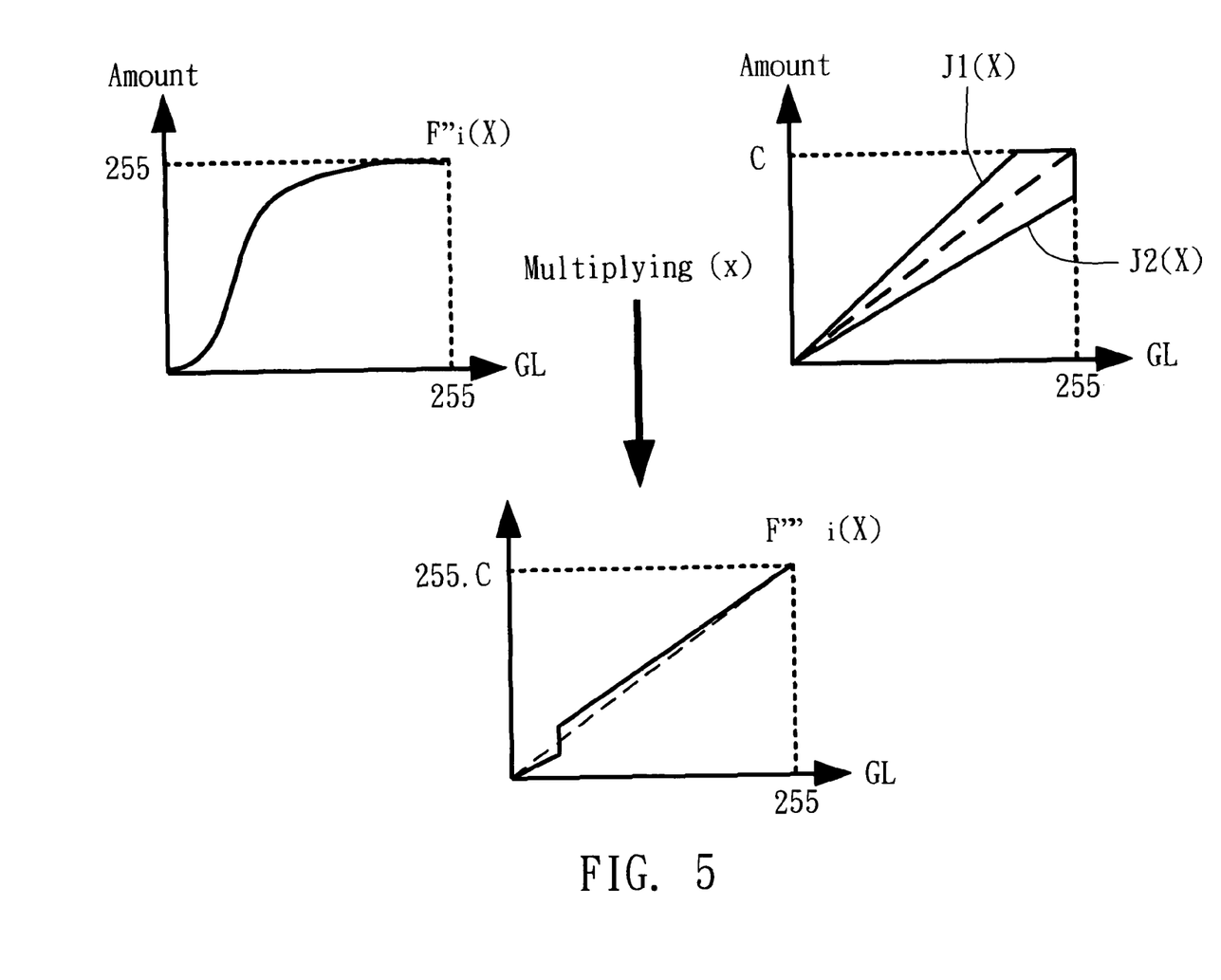
FIG. 5 illustrates diagrams for changing part of the upper and lower limits of the third transfer function.

To maintain frame stability, that is, to avoid image distortion or image glittering caused by violent changes in the luminance of the frame, the change in the Gamma curve can be smoothed by restricting the outputted value of the transfer function F(X). For example, at least one of the upper and the lower limits of the third transfer function $F''_i(X)$ is changed to obtain a fourth transfer function $F'''_i(X)$. As shown in FIG. 5, diagrams for changing part of the upper and lower limits of the third transfer function are shown. For example, the third transfer function F"(X) is multiplied by two transfer functions J1(X) and J2(X) to obtain the fourth transfer function $F'''_i(X)$. If the third transfer function F"(X) is larger than the transfer function J1(X), the transfer function J1(X) is outputted; and if the transfer function F"(X) is smaller than the transfer function J2(X), the transfer function J2(X) is outputted. Afterwards, another Gamma curve G'(X) is generated according to the fourth transfer function $F'''_i(X)$. For example, the Gamma curve G'(X) is generated according to the processing in step 406.

The second transfer function $F'_i(X)$ may be used to determine whether the original gray level GL of the current frame needs to be adjusted according to Gamma curve G(X). That is, if the accumulated maximum value of the second transfer function $F'_1(X)$ is larger than a first predetermined value W1, the original gray level of the current frame is adjusted according to the Gamma curve G(X). For example, if the second transfer function $F'_1(X)$ of the first frame f(1) is smaller than the first predetermined value W1, that is, the accumulated amount is not larger than the predetermined value W1, the first frame f(1) is defined as a smooth scenario; otherwise, the first frame f(1) is defined as an ordinary scenario. Under the smooth scenario, the above Gamma curve $G_1(X)$ is not used to adjust the original gray level GL of the first frame f(1), so the image frame is maintained stable. Under the ordinary scenario, the above Gamma curve $G_1(X)$ is used to adjust the original gray level GL of the first frame f(1). Besides, the Gamma curve $G_1'(X)$ can be used to adjust the original gray level GL of the first frame f(1), so the image frame is maintained stable.

An image may include several frames f(N), each of the frames f(N) respectively corresponds to a calculated amount of an original gray level, that is, the first transfer function $F_i(X)$. By comparing the two first transfer functions $F_i(X)$ of the current and the previous frames, whether the original gray level GL of the current frame is adjusted according to the Gamma curve G(X) of the current frame or according to the Gamma curve G(X) of the previous frame is determined. Examples of the comparison includes whether the difference of gray levels in the same pixel or pixel region between the current frame and the previous frame is within a predetermined tolerance. The first frame f(1) and the second frame f(0), that is, the previous frame of the first frame f(1), are taken for example. The first frame f(1) corresponds to the first transfer function $F_1(X)$, and the second frame f(0) corresponds to another first transfer function $F_0(X)$. Firstly, the first transfer function $F_1(X)$ of the first frame f(1) is integrated to obtain a first integral E1. Next, the first transfer function $F_0(X)$ of the second frame f(0) is subtracted from the first transfer function $F_1(X)$ of the first frame f(1) to generate a difference, and the absolute value of the difference is integrated to obtain a second integral E2. If the ratio of the second integral E2 to the first integral E1, i.e. E2/E1, is larger than a second predetermined value W2, significant difference exists between the current first frame f(1) and the second frame f(0). If significant difference exists, the original gray level GL of the first frame f(1) is adjusted according to the Gamma curve $G_1(X)$ generated according to the first transfer function $F_1(X)$; otherwise, the original gray level GL of the first frame f(1) is adjusted according to a Gamma curve $G_0(X)$ generated according to the first transfer function $F_0(X)$ of the previous frame.

To summarize, the above method adjusts the rate of change of the Gamma curve or selects the Gamma curve of the previous frame according to the transfer function $F_i(X)$ of various forms to avoid image distortion or image glittering due to violent changes in the luminance of the frame.

Besides, the third method is comparing the first transfer function $F_i(X)$ corresponding to the current and the previous frames to determine whether to adjust the original gray level GL of the current frame according to the Gamma curve G(X) of the current frame or the Gamma curve G(X) of the previous frame. Whether the original gray level GL of the current frame is adjusted according to the Gamma curve G(X) of the current frame or the Gamma curve G(X) of the previous frame can be determined by comparing the two first pixel transfer functions $H_i(X)$ of the current and the previous frames. The first pixel transfer function $H_i(X)$ is relative to the amount of the original gray levels of a frame, that is, the amount of original gray levels of each pixel in a frame. The first frame f(1) and the second frame f(0) are taken for example. Firstly, the amount of original gray levels of the first frame f(1) is calculated and a first pixel transfer function $H_1(X)$ relative to the amount of the original gray levels of the first frame f(N) is generated. Besides, the amount of original gray levels of the second frame f(0) is calculated and another second pixel transfer function $H_{N-1}(X)$ relative to the original gray level of the second frame f(N-1) is generated. Next, after the first pixel transfer function $H_N(X)$ is integrated as a first integral E1', the absolute value of the difference between the first pixel transfer function $H_1(X)$ and the second pixel transfer function $H_0(X)$ is integrated to obtain a second integral E2'. If the ratio of the second integral E2' to the first integral E1', i.e. E2'/E1', is larger than a third predetermined value W2, significant difference exists between the first frame f(1) and the previous frame f(0). Meanwhile, the original gray level GL of the first frame f(1) is adjusted into an adjusted gray level GL' according to the Gamma curve G(X) generated by the first transfer function $F_N(X)$, otherwise, the original gray level GL of the first frame f(1) is adjusted into another adjusted gray level GL' according to another Gamma curve G(X) generated by the first transfer function $F_0(X)$ of the previous frame. Therefore, the invention can determine whether to use the Gamma curve of the current frame or the previous frame to adjust the original gray level GL of the current frame according to the conventional statistical method, that is, the first pixel transfer function Hi (X), so as to avoid image distortion or image glittering which occurs due to violent change in the luminance of the frame.

Besides, no matter the original gray level GL is adjusted by which Gamma curve, for example, the Gamma curve $G_i(X)$, $G'_i(X)$, $G_{i-1}(X)$ or $G'_{i-1}(X)$, color cast problem may occur to some pixels. For example, the original RGB gray level GL the pixel whose color is approximately red is (255, 12, 12). When the pixel is adjusted by the above Gamma curve, the RGB gray level GL is adjusted into (255, 30, 30) and becomes pink. Therefore, a first color-purality process is required to reduce the ratio of contrast enhancement, so that the frame f(N) looks more natural. In other words, the process is to prevent the above method for processing an image from resulting in color cast problem when any of the RGB colors of a pixel is near saturated, that is, to prevent the original gray levels GL (255, 12, 12) of the pixel from being adjusted into (255, 30, 30). The first color-purality process is expressed as: $GL_{new}$=[GL*max (RGB)+GL'*(B−max(RGB))]/B. In the above formula, B is a positive integer; GL is an original gray level; GL' is an adjusted gray level GL adjusted by a Gamma curve such as $G_N(X)$, $G'_N(X)$, $G_{N-1}(X)$ or $G'_{N-1}(X)$; and max(RGB) is the maximum gray level of the original gray level GL. When the original gray level GL is (255, 12, 12), the adjusted gray level GL' is (255, 30, 30) and B is 256, then $L_{new}$={(255, 12, 12) ×255+(255, 30, 30) ×(256−255)}/256. That is, $GL_{new}$ is approximate to (255, 12, 12). Thus, the original gray level GL (255, 12, 12) is adjusted by the above Gamma curves and changes to pink color (255, 30, 30) from red first, and then is adjusted to original color performance by the first color-purityprocess. That is, the adjusted gray level $GL_{new}$(255, 12, 12) makes the frame look more natural.

After having been adjusted by the color-purality process, the contrast of the adjusted gray level $GL_{new}$ of some pixels can be adjusted higher. Therefore, the invention further includes a second color-purality process expressed as: $GL'_{new}=(P_{LC}*G'+P_L*GL)/B$. In the above formula, $$P_L=n*max(RGB)+m*color\_gap; \quad m+n=1; \quad P_{LC}=B-P_L;$$

color_gap=max(RGB)−min(RGB); B is a positive integer; and color_gap is the difference between the maximum gray level of the original gray level GL and the minimum gray level of the original gray level GL. The first color-purality process is used to enhance the contrast when the color of some pixels is almost white, that is, the RGB gray levels are very close to one another. The second color-purality process is able to enhance the contrast by adjusting the RGB gray levels when the RGB gray levels of some pixels are very close to one another and close to 255. In other words, the second color-purality process is able to increase the gray level and make the contrast ratio higher if the contrast ratios of some pixels are reduced after the adjustment of the first color-puralityprocess, so that the contrast of the image is enhanced. The GL(200, 198,202) whose color is almost white is taken for example. It is assumed that the contrast ratio of the GL(200,198,202) is $GL_{new}$(211,210,213) after the adjustment of the first color-purality process. However, the contrast of $GL_{new}$(200,198, 202) still can be adjusted higher. That is, the contrast can be enhanced. Therefore, the second color-purality process is used to increase the contrast ratio and make the contrast of the image further enhanced.

The method for processing an image disclosed in the above embodiments of the invention enhances the contrast of an image and maintains the stability of the image frame while the characteristics of the image are maintained natural.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for processing an image, applied to a display apparatus, wherein the image is displayed by at least one first frame f(N), and the at least one first frame f(N) is composed of a plurality of pixels, each of which respectively corresponds to an original gray level, the method comprising:

calculating the amount of the original gray levels according to an original gray level difference between every adjacent two of the pixels and generating a first transfer function Fi(X) relative to the amount of the original gray levels, where i is a positive integer ranging from 1 to N;

generating a Gamma curve according to the first transfer function Fi(X); and selectively adjusting the original gray levels to a plurality of adjusted gray levels according to the Gamma curve to obtain an image having enhanced contrast for display on said display apparatus;

wherein the image is further displayed by a second frame f(N−1) prior to the first frame f(N), and the step of adjusting the original gray levels to the adjusted gray levels comprises:

integrating the first transfer function FN(X) of the first frame f(N) into a first integral;

generating a difference by subtracting the first transfer function F N−1(X) of the second frame f(N−1) from the first transfer function FN(X) of the first frame f(N) and integrating an absolute value of the difference to obtain a second integral; and adjusting the original gray levels of the first frame f(N) into the adjusted gray levels according to the first transfer function FN(X) of the first frame if a ratio of the second integral to the first integral is larger than a second predetermined value, or otherwise, adjusting the original gray levels of the first frame f(N) into the adjusted gray levels according to the first transfer function FN−1(X) of the second frame f(N−1).

2. The method according to claim 1, wherein the step of generating the Gamma curve comprises:

linearly transforming the first transfer function Fi(X) to a linearly transformed first transfer function;

accumulating the linearly transformed first transfer function to obtain a second transfer function F'i(X);

normalizing the second transfer function F'i(X) to obtain a third transfer function F"i(X); and multiplying the third transfer function F"i(X) by K to obtain a product and adding a parameter P(X) to the product to obtain the Gamma curve, wherein the parameter P(X) is a transfer function whose slope is equal to (1−k), where K ranges from about 0 to about 1.

3. The method according to claim 1, wherein the step of generating the Gamma curve comprises:

linearly transforming the first transfer function Fi(X) to a linearly transformed first transfer function;

accumulating the linearly transformed first transfer function to obtain a second transfer function F'i(X);

normalizing the second transfer function F'i(X) to obtain a third transfer function F"i(X);

changing at least one of the upper and the lower limits of the third transfer function F"i(X) to obtain a fourth transfer function F'"i(X); and multiplying the fourth transfer function F'"i(X) by K to obtain a product and adding a parameter P(X) to the product to obtain the Gamma curve, wherein the parameter P(X) is a transfer function whose slope is equal to 1−k, where K ranges from about 0 to about 1.

4. The method according to claim 2, wherein the step of selectively adjusting the original gray levels to the adjusted gray levels comprises:

adjusting the original gray levels according to the Gamma curve when the accumulated maximum value of the second transfer function F'i(X) is larger than a first predetermined value.

5. The method according to claim 3, wherein the step of selectively adjusting the original gray levels to the adjusted gray levels comprises:

adjusting the original gray levels according to the Gamma curve when the accumulated maximum value of the second transfer function F'i(X) is larger than a first predetermined value.

6. The method according to claim 1, wherein the original gray levels respectively correspond to an original red gray level, an original green gray level and an original blue gray level, and the method further comprises:

applying a first color-purality process to adjust the adjusted gray level into a first weighted gray level according to a ratio of one of the original red gray level, the original green gray level and the original blue gray level to a standard maximum gray level.

7. The method according to claim 6, further comprising:

subsequent to the step of applying the first color-purality process, applying a second color-purality process to adjusting the first weighted gray level into a second weighted gray level according to ratios of any two of the original red gray level, the original green gray level, and the original blue gray level.

8. A method for processing an image, applied to a display apparatus, wherein the image is displayed by at least one first frame f(N), and the at least one first frame f(N) is composed of a plurality of pixels, each of which respectively corresponds to an original gray level, the method comprising:

calculating the amount of the original gray levels according to an original gray level difference between every adjacent two of the pixels and generating a first transfer function Fi(X) relative to the amount of the original gray levels, where i is a positive integer ranging from 1 to N;

generating a Gamma curve according to the first transfer function Fi(X); and selectively adjusting the original gray levels to a plurality of adjusted gray levels according to the Gamma curve to obtain an image having enhanced contrast for display on said display apparatus;

wherein the image is further displayed by a second frame f(N−1) prior to the first frame f(N), and the step of adjusting the original gray levels to the adjusted gray levels further comprises:

calculating the amount of the original gray levels of the first frame f(N) and generating a first pixel transfer function HN(X) relative to the amount of the original gray levels of the first frame f(N);

calculating the amount of the original gray levels of the second frame f(N−1) and generating a second pixel transfer function HN−1(X) relative to the amount of the original gray levels of the second frame f(N−1);

integrating the first pixel transfer function HN (X) to obtain a first integral;

generating a difference by subtracting the second pixel transfer function HN−1 (X) from the first pixel transfer function HN (X) and integrating an absolute value of the difference to obtain a second integral; and adjusting the original gray levels of the first frame f(N) into the adjusted gray levels according to the first transfer function FN(X) of the first frame when a ratio of the second integral to the first integral is larger than a third predetermined value, or otherwise, adjusting the original gray levels of the first frame f(N) into the adjusted gray levels according to the first transfer function FN−1(X) of the second frame f(N−1).

* * * * *